United States Patent [19]
Jaspers

[11] Patent Number: 5,537,071
[45] Date of Patent: Jul. 16, 1996

[54] METHOD AND CIRCUIT FOR DIVIDING AN INPUT SIGNAL INTO AMPLITUDE SEGMENT SIGNALS AND FOR NON-LINEARLY PROCESSING THE AMPLITUDE SEGMENT SIGNALS ON THE BASIS OF THE VALUE OF EACH AMPLITUDE SEGMENT SIGNAL

[75] Inventor: Cornelis A. M. Jaspers, Eindhoven, Netherlands

[73] Assignee: U.S. Philips Corporation, New York, N.Y.

[21] Appl. No.: 342,981

[22] Filed: Nov. 21, 1994

[30] Foreign Application Priority Data

Nov. 23, 1993 [BE] Belgium .............................. 09301294

[51] Int. Cl.$^6$ .................................................. G06F 7/556
[52] U.S. Cl. ........................... 327/346; 327/361; 348/255; 348/672; 348/674
[58] Field of Search .................................. 327/306, 346, 327/350, 352, 355, 361; 348/254, 255, 674, 678, 687, 675–680, 672; 358/164, 169, 31

[56] References Cited

U.S. PATENT DOCUMENTS

| | | | |
|---|---|---|---|
| 4,550,340 | 10/1985 | Nicholson et al. | 358/31 |
| 4,553,158 | 11/1985 | Acampora | 358/31 |
| 4,597,007 | 6/1986 | Reitmeier et al. | 358/31 |
| 4,642,676 | 2/1987 | Weinger | 358/22 |
| 5,023,711 | 6/1991 | Erhardt | 358/76 |
| 5,089,890 | 2/1992 | Takayama | 358/164 |
| 5,258,928 | 11/1993 | Zdepski et al. | 364/553 |
| 5,294,989 | 3/1994 | Moore et al. | 348/241 |
| 5,307,166 | 4/1994 | Sadamatsu | 348/687 |
| 5,408,267 | 4/1995 | Main | 348/254 |

*Primary Examiner*—Timothy P. Callahan
*Assistant Examiner*—Kenneth B. Wells
*Attorney, Agent, or Firm*—Edward W. Goodman

[57] ABSTRACT

A non-linear circuit having a transfer characteristic which is adjustable per amplitude segment of an input signal (Yi) includes a segmenting circuit (11 . . . 15, 21 . . . 25) for obtaining a plurality of amplitude segment signals (Y1 . . . Y5) from the input signal (Yi), and a non-linear segment amplifier circuit (31 . . . 35) coupled to the segmenting circuit (11 . . . 15, 21 . . . 25) for separately multiplying segments (Y1 . . . Y5) of the input signal (Yi) by respective segment gain factors (HM1 . . . HM5) in dependence upon a common gain factor (HMa) derived from the segment gain factors (HM1 . . . HM5) and on the basis of the amplitude segment signals (Y1 . . . Y5) for supplying a signal (Y"s) which is adjustable per amplitude segment of the input signal (Yi). The non-linear circuit may also include an output circuit (37, 39) coupled to the non-linear segment amplifier circuit (31 . . . 35) for supplying an amplified output signal (Yhm), the amplification of which, with respect to the input signal (Yi), being adjustable per amplitude segment of the input signal (Yi).

7 Claims, 3 Drawing Sheets

METHOD AND CIRCUIT FOR DIVIDING AN INPUT SIGNAL INTO AMPLITUDE SEGMENT SIGNALS AND FOR NON-LINEARLY PROCESSING THE AMPLITUDE SEGMENT SIGNALS ON THE BASIS OF THE VALUE OF EACH AMPLITUDE SEGMENT SIGNAL

BACKGROUND OF THE INVENTION

1. Field of The Invention

The invention relates to non-linear signal processing having a transfer characteristic which is adjustably dependent on the amplitude of an input signal.

2. Description of The Related Art

In a digital circuit, such a non-linear signal processing can be realized in a very simple manner by means of a memory operating as a look-up table. However, in an analog circuit, a non-linear circuit having a transfer which is adjustably dependent on the amplitude of an input signal cannot be realized in an obvious manner.

EP-A-0 382 100, corresponding to U.S. Pat. No. 5,089, 890, discloses a gamma correction device which comprises a classifying circuit for dividing an input video signal into a plurality of level ranges according to a plurality of signal levels, a computing circuit for computing the region of the video signal within each of the level ranges obtained by the classifying circuit, and a gamma correction control circuit which is arranged to have the gamma correction characteristic thereof controlled, according to each region computed by the computing circuit, to gamma-correct the input video signal and to output the gamma-corrected video signal. This device shows the disadvantage that a period of time is required for computing the region according to the level range of the video signal. Therefore, the gamma-correction cannot be carried out in real time.

DE-A-42 37 420, corresponding to U.S. Pat. No. 5,307, 166, discloses an automatic image-tone control circuit and method for controlling image brightness. An input-output characteristic having an arbitrary line graph is obtained by plural gradient adjusting circuits in response to frequencies of appearance of the brightness of the luminance which are detected by a plural brightness frequency detection circuits. Each gradient adjusting circuit comprises an adjusting current generation circuit, and an adding circuit for adding an adjusting current from the corresponding adjusting current generation circuit to other adjusting currents from adjusting current generation circuits of lower ranking gradient adjusting circuit, these other adjusting currents being weighted by factors depending on the difference in rank between the present gradient adjusting circuit and the respective lower ranking gradient adjusting circuit. Each gradient adjusting circuit further comprises a gradient adjusting current generation circuit for multiplying all of the input signal by a factor which depends on an output signal of the corresponding adding circuit. This results in a rather complex circuit with a limited flexibility.

SUMMARY OF THE INVENTION

It is, inter alia, an object of the invention to provide a simple and flexible analog non-linear signal processing having a transfer which is adjustably dependent on the amplitude of an input signal. To this end a first aspect of the invention provides a non-linear circuit having a transfer which is adjustable per amplitude segment of an input signal, said non-linear circuit comprising means for supplying segment gain factors per amplitude segment of the input signal, and for supplying a common gain factor in dependence upon said segment gain factors; segmenting means for obtaining a plurality of amplitude segment signals from the input signal; and non-linear segment amplification means coupled to the segmenting means for separately multiplying segments of the input signal by the respective segment gain factors in dependence upon said common gain factor and on the basis of the amplitude segment signals for supplying a non-linear signal which is adjustable per amplitude segment of the input signal. A second aspect of the invention provides a method of non-linearly processing an input signal having a transfer which is adjustable per amplitude segment of the input signal, comprising the steps supplying segment gain factors per amplitude segment of the input signal; supplying a common gain factor in dependence upon said segment gain factors; obtaining a plurality of amplitude segment signals from the input signal; and non-linearly and separately multiplying segments of the input signal by the respective segment gain factors in dependence upon said common gain factor and on the basis of the amplitude segment signals for supplying a non-linear signal which is adjustable per amplitude segment of the input signal.

According to a principal aspect, the invention provides a non-linear circuit having a transfer which is adjustable per amplitude segment of an input signal, the nonlinear circuit comprising a segmenting circuit for obtaining a plurality of amplitude segment signals from the input signal, and a non-linear segment amplifier circuit coupled to the segmenting circuit for separately multiplying segments of the input signal by respective segment gain factors in dependence upon a common gain factor derived from the segment gain factors on the basis of the amplitude segment signals for supplying a signal which is adjustable per amplitude segment of the input signal. The non-linear circuit may further comprise an output circuit coupled to the non-linear segment amplifier circuit for supplying an amplified output signal, the amplification of which with respect to the input signal being adjustable per amplitude segment of the input signal.

Such a circuit may be used advantageously as a nonlinear amplifier in an analog picture enhancement circuit which, based on a measured histogram, adjusts the amplification of the non-linear amplifier per histogram segment in dependence upon a measured histogram segment value. As, in accordance with the present invention, each segment of the input signal is separately treated by the non-linear segment amplification means, a non-linear signal processing is obtained which is simpler and more flexible than in the prior art. The use of the common gain factor, which can be (weighted) average of (weighted) sum of the segment gain factors, has appeared to be a very easy and simple means for ensuring that the overall transfer of the non-linear circuit has smooth transitions between the respective segments.

These and other aspects of the invention will be apparent from and elucidated with reference to the embodiments described hereinafter.

DESCRIPTION OF THE PREFERRED EMBODIMENTS

Figure 1:
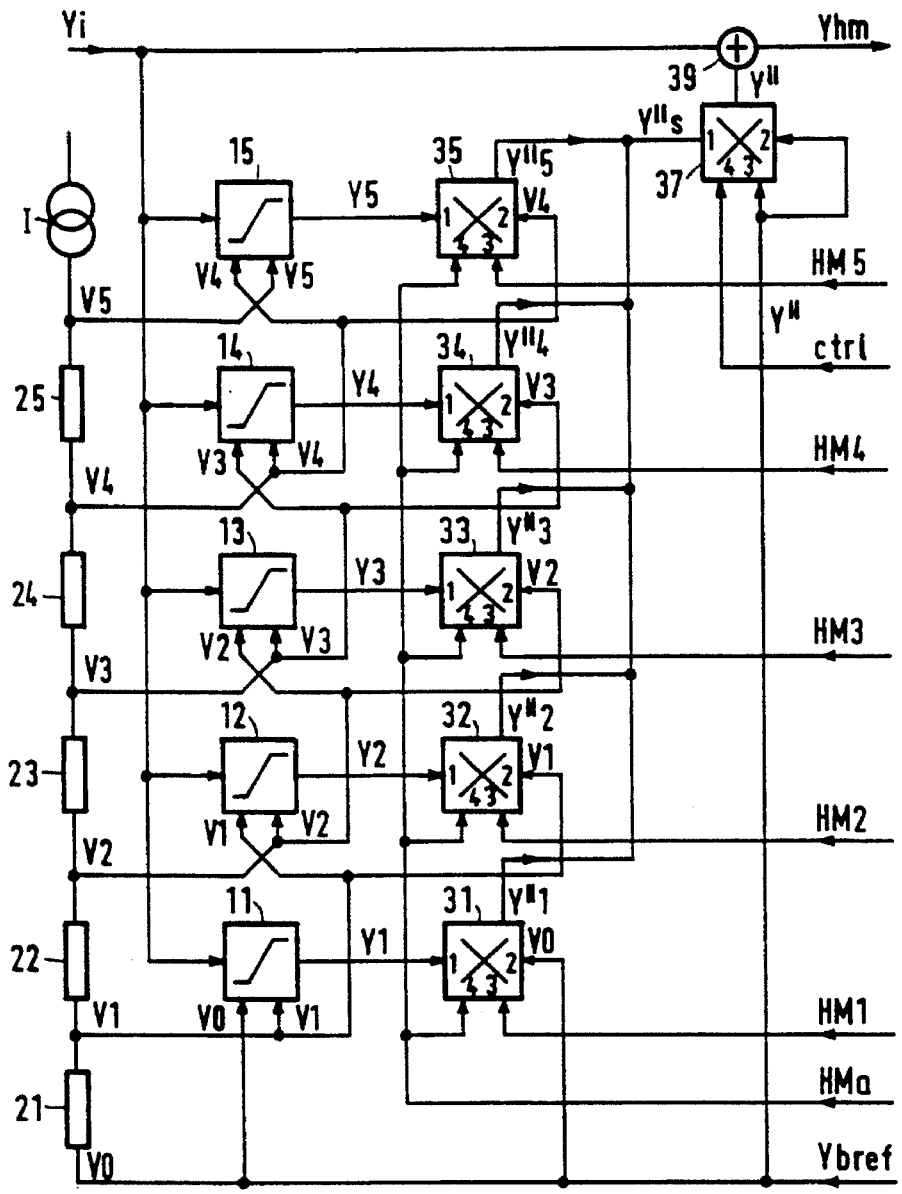
FIG. 1 shows a first embodiment of a non-linear amplifier according to the invention.

In the embodiment of FIG. 1, an input signal Yi (for example, a luminance signal) is applied to five segment gate circuits 11–15. A different number of segments is alternatively possible; the number of 5 appeared to yield good results for analog picture enhancement using histogram conversion. The segments may be of equal size or have arbitrary lengths; in the latter case, however, certain modifications should be applied with respect to the following description. Gate boundary inputs of the segment gate circuits 11–15 receive voltages V0–V5 from terminals of a resistance ladder 21–25 to which a current I is applied and whose lowest voltage V0 is a black level reference voltage Ybref and the highest voltage V5 is equal to V0+I*(R21+R22+R23+R24+R25). The gate circuit 1x supplies a signal Yx which is equal to $V(x-1)$ if $Yi \leq V(x-1)$, which is equal to Yi if $V(x-1) \leq Yi \leq Vx$, and which is equal to Vx if $Yi \geq Vx$, with $x=1\ldots 5$. The signals Y1–Y5 are applied to first inputs 1 of differential amplifiers 31–35 which receive the voltages V0–V4 at second inputs 2. Third inputs 3 of the differential amplifiers (multipliers) 31–35 receive bias voltages HM1–HM5 which may originate from measured histogram segment values in a preferred application of the non-linear amplifier according to the invention. Fourth inputs 4 of the differential amplifiers 31–35 receive the mean value HMa of the bias voltages HM1–HM5; for segments of arbitrary lengths, each bias voltage is to be weighted by a factor which depends on the relative length of the segment in the determination of HMa. The products Y"1–Y"5 at the outputs of the differential amplifiers (multipliers) 31–35 are obtained in accordance with the formula Output=(Input_1−Input_2 )*(Input_3−Input_4)*K.

The signal Y"5 is thus obtained in accordance with Y"5=(Y5−V4)*(HM5−HMa)*K. Here, K is a constant which is preferably equal to 0.6. The difference term Vx at the second inputs 2 of the differential amplifiers 31–35 ensures that the amplitudes Y(x+1) which are equal to the lower limit Vx of the relevant segment (which is the case when the amplitude Yi of the input signal is smaller than or equal to this lower limit Vx) do not lead to a contribution in the output signal of the differential amplifier 3x. Differential amplifiers (multipliers) 31–35 as described above are known as Gilbert cells and are commercially available (for example, Motorola IC MC1495L).

The output signals Y"1–Y"5 of the differential amplifiers 31–35 are added to form a sum signal Y"s by interconnecting the outputs of the differential amplifiers. The sum signal Y"s is applied to a differential amplifier 37 for obtaining a term Y" in accordance with Y"=(Y"s−V0)*(V0−Y"ctrl) in which Y"ctrl is a bias voltage. The term Y" is added to the input signal Yi in an adder 39 for obtaining an output signal Yhm which is thus obtained from the input signal Yi by non-linear amplification by gain factors HM1 . . . HM5 which are adjustable per amplitude segment V0–V1 . . . V4–V5 of the input signal Yi.

Due to the segmented multiplication by factors HMx-HMa ($x=1\ldots 5$) it is achieved that the gain characteristic always passes through the points (0, 0) and (Vmax, Vmax) independent of the bias voltages HM1–HM5, with Vmax being the maximally allowed value of the input signal Yi. It is thereby also achieved that the non-linear amplification is obtained by means of an addition of a correction term Y" to the input signal Yi, so that the greater part Yi of the output signal Yhm is subjected to a minimal number of noise-introducing circuit elements.

Figure 2:
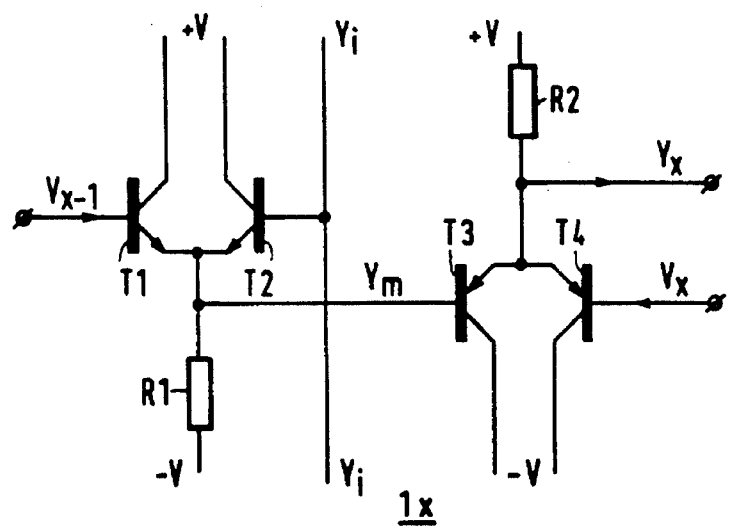
FIG. 2 shows an embodiment of a gate circuit for use in the non-linear amplifier shown in FIG. 1.

FIG. 2 shows an embodiment of a gate circuit 1x ($x=1\ldots 5$) for use in the non-linear amplifier of FIG. 1. The lower limit voltage $V(x-1)$ is applied to a base of a transistor T1 of an NPN differential amplifier pair T1, T2 whose collectors are connected to a positive power supply voltage +V and whose interconnected emitters are connected to a negative power supply voltage −V via resistor R1. The input voltage Yi is applied to the base of the transistor T2. The voltage Ym at the emitters of the transistors T1, T2 is the maximum value of the lower limit voltage $V(x-1)$ and the input signal Yi. The emitters of the transistors T1, T2 are connected to the base of a transistor T3 of a PNP differential amplifier pair T3, T4 whose collectors are connected to the negative power supply voltage -V and whose interconnected emitters are connected to the positive power supply voltage +V via a resistor R2. The upper limit voltage Vx is applied to the base of the transistor T4. The output voltage Yx, which is equal to the minimum value of the upper limit voltage Vx and the voltage Ym, can be derived from the emitters of the transistors T3, T4.

Figure 3:
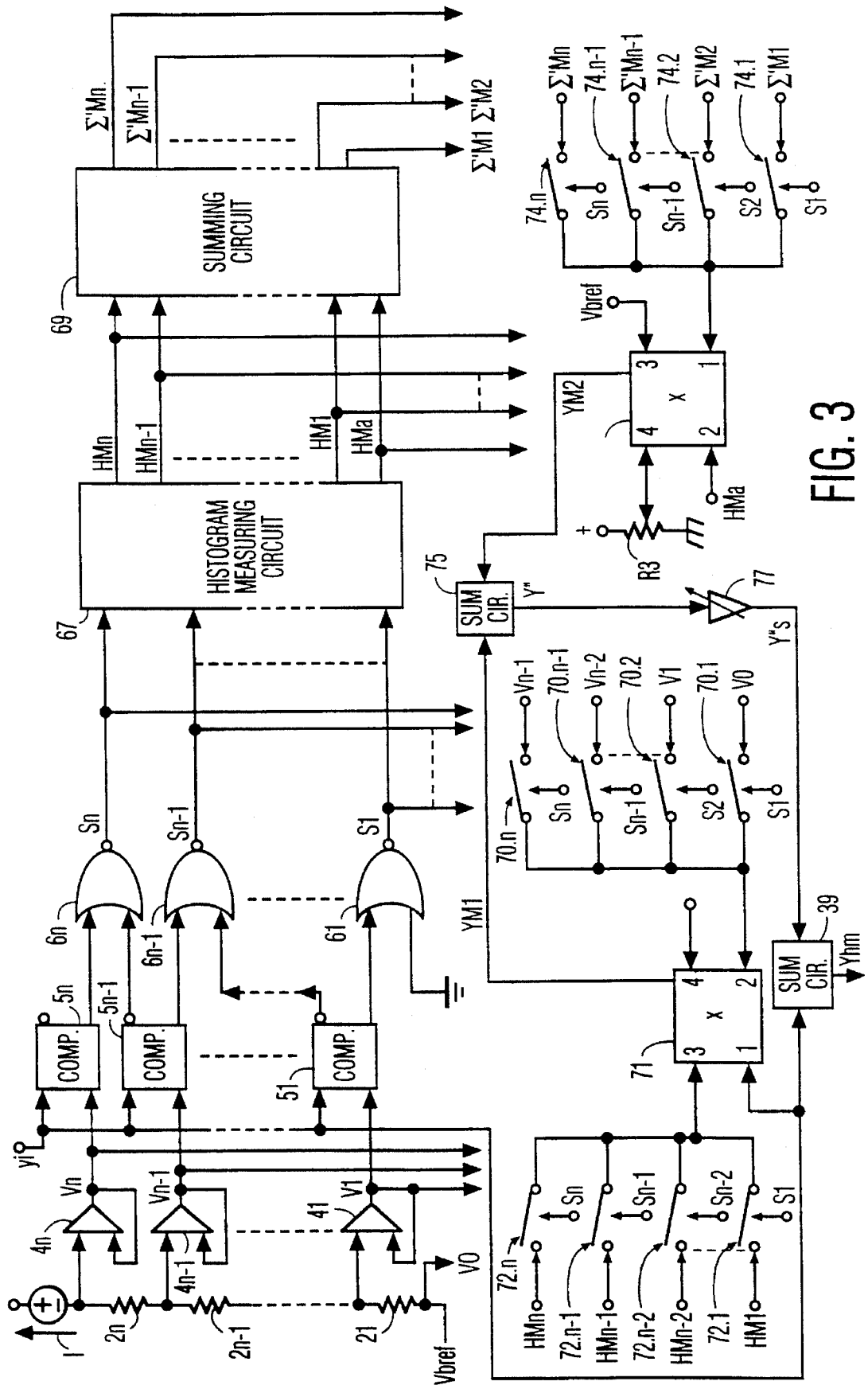
FIG. 3 shows a second embodiment of a non-linear amplifier according to the invention.

FIG. 3 shows a second embodiment of a non-linear amplifier according to the invention, which is particularly suitable for realization in CMOS. To determine within which of the five amplitude segments (having an equal or arbitrary size) the input signal Yi is present, the input signal Yi is applied to first inputs of a number n (for example, five) comparators 51 . . . 5n. Second inputs of the comparators 51 . . . 5n are connected to a resistance ladder 21 . . . 2n via buffer amplifiers 41 . . . 4n. A current, which is supplied by a current source I coupled to one end of the resistance ladder, flows through the resistance ladder 21 . . . 2n. The lowest reference voltage level Vbref (for example, a black level reference voltage) is applied to the other end of the resistance ladder 21 . . . 2n; the other terminals of the resistance ladder convey, each time, higher voltages V1 . . . Vn. Outputs of the comparators 21 . . . 2n are connected to first inputs of logic NOR circuits 61 . . . 6n, second inputs of which are connected to ground and to the outputs of the comparators 51 . . . 5(n−1), respectively. Output signals S1 . . . Sn of the NOR circuits 61 . . . 6n indicate within which amplitude segment the instantaneous signal Yi is present.

The amplitude segment indication signals S1 . . . Sn may be applied to a histogram measuring circuit 67 for obtaining bias voltages HM1 . . . HMn, as well as their mean value HMa, for adjusting the gain characteristic of the non-linear amplifier. However, it is irrelevant for the operation of the non-linear amplifier whether the bias voltages HM1 . . . HMn are obtained by means of a histogram measurement or in another way. The bias voltages HM1 . . . HMn are applied to a summing circuit 69 for determining sum signals ΣM1 . . . ΣMn in accordance with the formulas:

ΣM1=0, ΣM2=HM1−HMa and

ΣMi=(HM1−HMa)+. . . +(HM$_{i-1}$−HMa) for i≧3.

To enable correct operation by CMOS switches, the mean histogram value HMa is added to each of the signals ΣMx so as to obtain positive values $\Sigma'Mx=\Sigma Mx+HMa$, with $\Sigma'M1=HMa$, $\Sigma'M2=HM1$, $\Sigma'M3=HM1+HM2-HMa$, etc.

If the segments have arbitrary lengths, the formulas for $\Sigma Mi$ should be adapted in such a way that each difference $HMx-HMa$ is weighted by the ratio between the length of the relevant segment and the shortest segment length. Let it be assumed that there are 5 segments whose lengths li are in a ratio of 1:2:4:2:1. The factors HM2–HMa and HM4–HMa should then be multiplied by 2/1, and the factor HM3–HMa should be multiplied by 4/1. Moreover, it holds for the mean histogram value HMa that the mean histogram value HMa is equal to:

$$\Sigma[li*HMi]/\Sigma li,$$

or $$[(1*0)+(2*1)+(4*3)+(2*1)+(1*0)]/10=1.6$$

if the histogram values HM1 ... HM5 are successively, for example, 0, 1, 3, 1, 0, so that the lengths of the segments are taken into account also when the mean histogram value HMa is determined.

The input signal Yi is further applied to a first input 1 of a differential amplifier 71 which may be of the same type as the differential amplifiers 31 ... 3n shown in FIG. 1. One of the voltages V0 ... V(n–1) is applied to a second input 2 of the differential amplifier 71 via switches 70.1, ..., 70.n which are controlled by the amplitude segment indication signals S1 ... Sn. It holds that the voltage V(x–1) is applied to the second input of the differential amplifier 71 via the switch 70.x controlled by the amplitude segment indication signal Sx, with x=1 ... n, if the instantaneous input signal Yi falls within the amplitude segment associated with the amplitude segment indication signal Sx. One of the bias voltages HM1 ... HMn is applied to a third input 3 of the differential amplifier 71 via switches 72.1, ..., 72.n which are controlled by the amplitude segment indication signals S1 ... Sn. It holds that the bias voltage HMx is applied to the third input 3 of the differential amplifier 71 via the switch 72.x controlled by the amplitude segment indication signal Sx, with x=1 ... n, if the instantaneous input signal Yi falls within the amplitude segment associated with the amplitude segment indication signal Sx. The mean value HMa of the bias voltages HM1 ... HMn is applied to a fourth input 4 of the differential amplifier 71. The single differential amplifier 71 with the series of switches 70.x and 72.x controlled by the amplitude segment indication signals S1 ... Sn at the inputs 2 and 3, is equivalent to the separate differential amplifiers 31–35 in FIG. 1. The differential amplifier 71 amplifies the difference signal Yi-Vx of a segment as a function of HMx-HMa, in which the control signal value HMx and the voltage Vx associated with the amplitude segment x within which the instantaneous input signal Yi is present, are applied to the differential amplifier 71 via the switches 70.x and 72.x controlled by the amplitude segment indication signal Sx.

Each time, the signal $\Sigma'M1$ ... $\Sigma'Mn$ associated with the current amplitude segment is applied to a first input 1 of a differential amplifier 73 via switches 74.1, ..., 74.n controlled by the signals S1 ... Sn. The signal HMa is also applied to the second input 2 of the differential amplifier 73. The reference voltage Vbref is applied to a third input 3 of the differential amplifier 73. A bias voltage obtained by means of a potentiometer R3 is applied to a fourth input 4 of the differential amplifier 73. The differential amplifier 73 multiplies $\Sigma'Mx-HMa=\Sigma Mx$ by an adjustable factor which is dependent on Ybref and the resistor R3.

An output signal YM2 of the differential amplifier 73 is added to an output signal YM1 of the differential amplifier 71 by means of an adder 75. The output signal Y" of the adder 75 is applied to the adder 39 via a controllable amplifier 77, for addition to the input signal Yi in order to obtain the non-linearly processed output signal Yhm.

Figure 4A:
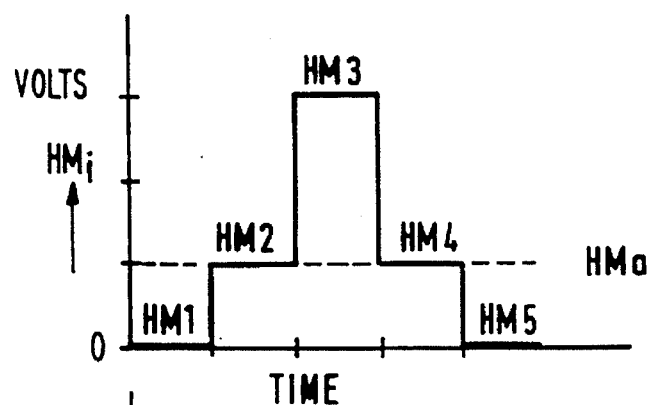
FIGS. 4A–4D show diagrams to explain the operation of the non-linear amplifier of FIG. 3.
Figure 4B:
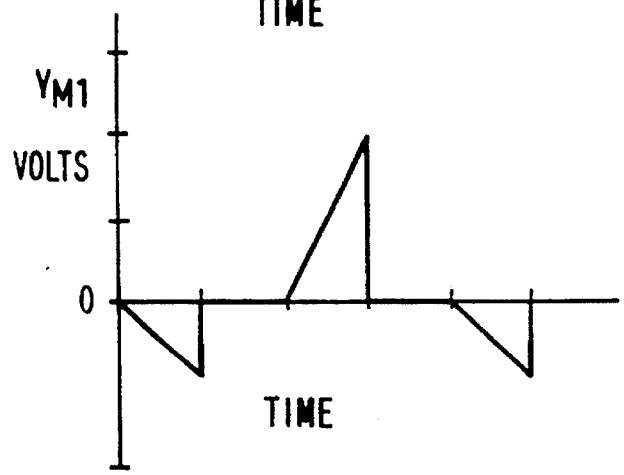
Figure 4C:
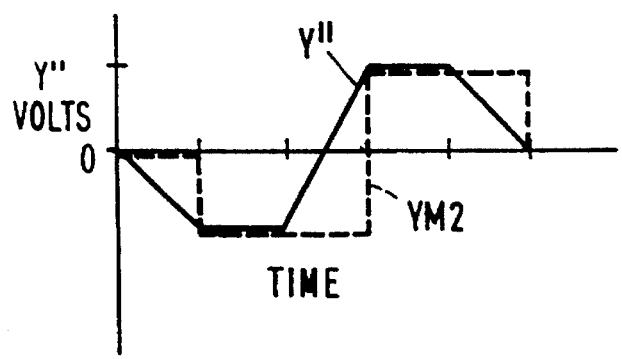
Figure 4D:
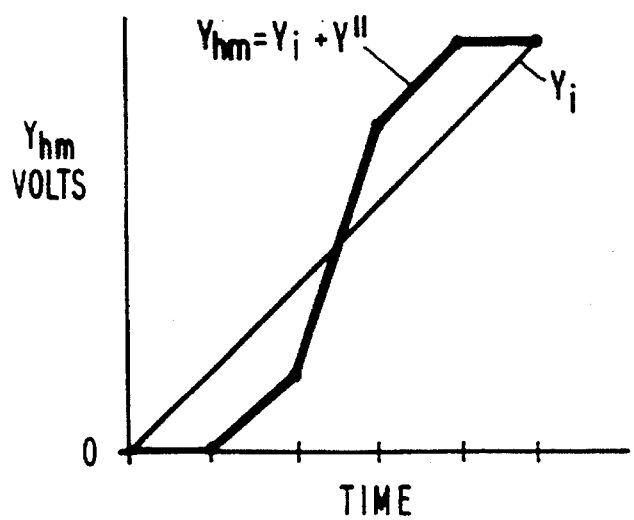

FIGS. 4A–4D show diagrams to explain the non-linear amplifier of FIG. 3. FIG. 4A shows a possible histogram obtained from the video signal. FIG. 4D shows an input signal Yi by means of a thin line (which signal falls outside the measuring window of the histogram measurement). FIG. 4B shows the output signal YM1 of the amplifier 71 as a function of the difference between the input signal Yi and the lower limit Vx of the current histogram segment, on the one hand, and the difference between the current histogram value HMx and the mean histogram value Hma, on the other hand: where the histogram value HMx is zero, the amplifier 71 has a negative transfer with slope 1; where the histogram value HMx is equal to the mean value HMa, the amplifier 71 has an output signal which is equal to zero; and where the histogram value HMx is twice the mean value HMa above this mean value HMa, the amplifier 71 has a positive transfer with slope 2. FIG. 4C shows, by means of a solid line, the desired correction signal Y" which must be added to the input signal Yi so as to obtain the non-linearly amplified output signal Yhm, and a broken line shows the output signal YM2 of the amplifier 73 which must be added to the output signal YM1 of the amplifier 71 so as to obtain the desired correction signal Y". This output signal YM2 of the amplifier 73 is equal to the sum of the previous histogram values considered with respect to the mean histogram value Hma. FIG. 4D shows the output signal Yhm=Yi+Y" of the non-linear amplifier of FIG. 3 by means of a fat line.

In other words, the embodiment shown in FIG. 3 of the non-linear amplifier having a gain which is adjustable per amplitude segment of an input signal Yi according to the invention, comprises a segmenting circuit 21 ... 6n for obtaining a plurality of amplitude segment signals S1 ... Sn from the input signal Yi, a non-linear segment amplifier circuit 71 ... 77 coupled to the segmenting circuit 21 ... 6n for multiplying the input signal Yi by respective segment gain factors HM1 ... HM5 on the basis of the amplitude segment signals S1 ... S5 for supplying a signal Y" which is adjustable per amplitude segment of the input signal Yi, and an output circuit 39 coupled to the nonlinear segment amplifier circuit 71 ... 77 for supplying an amplified output signal Yhm which is adjustable per amplitude segment of the input signal Yi. In this respect it should be noted that in the embodiment of FIG. 3, the amplitude segment signals Sx are an indication of the amplitude segment within which the instantaneous input signal Yi is present, while in the embodiment of FIG. 1, the amplitude segment signals Yx are equal to that part of the input signal Yi which falls within the amplitude segment indicated by the number x.

For both embodiments shown in FIGS. 1 and 3, it holds that, in principle, any non-linear transfer can be realized by means of the (possibly externally applied) segment gain factors HM1 ... HM5. Moreover, by choosing unequal segment lengths, a desired transfer characteristic of the non-linear amplifier may be obtained also for a very small number of segments. Because of the small number of multipliers, the non-linear amplifier shown in FIG. 3 is also suitable for a large number of histogram segments, as the switches additionally required in the circuit of FIG. 3 as compared with those in the circuit of FIG. 1 occupy only a small space on an integrated circuit.

It is to be noted that the embodiments described hereinbefore elucidate instead of limit the invention and that those skilled in the art will be able to design many alternative embodiments without passing beyond the scope of the appendant claims. For example, it is possible to have the nonlinearity of the non-linear amplifier depend on the statistical deviation (standard deviation) of the histogram values HM1 . . . HM5 in that the correction term Y" is multiplied by or added to a value dependent on the statistical deviation before this correction term is added to the input signal Yi. A too large non-linearity at a high statistical deviation can thereby be prevented, and an extra amplification of the correction term Y" can be obtained at a low statistical deviation. A better adaptation to the sensitivity of the human eye may be obtained by excluding the histogram segment HM5 of the largest amplitude value from the computation of the statistical deviation. This correction term adaptation based on the standard deviation may alternatively be effected in a digital non-linear circuit.

I claim:

1. A non-linear circuit having a transfer characteristic which is adjustable depending on an amplitude of an input signal, comprising:

an input for receiving said input signal;

segmenting means coupled to said input for forming a plurality of contiguous amplitude segments, and for comparing said input signal to each of said plurality of amplitude segments thereby obtaining a respective plurality of amplitude segment signals from the input signal;

means for generating a plurality of segment gain factors corresponding, respectively, to said plurality of amplitude segments, and for generating a mean gain factor from a combination of said plurality of segment gain factors; and non-linear segment amplification means coupled to the segmenting means and said means for generating a plurality of segment gain factors and for generating a mean gain factor for modifying each of said plurality of segment gain factors by said mean gain factor thereby forming a respective plurality of modified segment gain factors, and for separately multiplying said plurality of amplitude segment signals by the respective plurality of modified segment gain factors for supplying a non-linear signal at an output of said non-linear amplitude segment amplification means.

2. A non-linear circuit as claimed in claim 1, wherein said non-linear circuit further comprises output means coupled to said input and to the output of the non-linear segment amplification means for supplying an output signal to an output of said non-linear circuit, said output means forming said output signal by modifying said input signal by said non-linear signal.

3. A non-linear circuit as claimed in claim 2, wherein the output means comprises an adder having a first input coupled for receiving the input signal, a second input coupled to the non-linear segment amplification means for receiving the non-linear signal, and an output for supplying the output signal.

4. A non-linear circuit as claimed in claim 1, wherein said non-linear circuit further comprises:

means for determining a standard deviation of the segment gain factors to each other; and means for multiplying the non-linear signal by a value which is dependent on the standard deviation of the segment gain factors.

5. A non-linear circuit as claimed in claim 1, wherein said segmenting means forms five contiguous amplitude segments.

6. A non-linear circuit as claimed in claim 1, wherein said non-linear circuit further comprises:

means for determining a standard deviation of the segment gain factors to each other; and means for adding the non-linear signal to a value which is dependent on the standard deviation of the segment gain factors.

7. A method of non-linearly processing an input signal having a transfer characteristic which is adjustable depending on an amplitude of said input signal, said method comprising the steps:

receiving said input signal;

forming a plurality of contiguous amplitude segments, and comparing said input signal to each of said plurality of amplitude segments thereby obtaining a respective plurality of amplitude segment signals from the input signal;

generating a plurality of segment gain factors corresponding, respectively, to said plurality of amplitude segments, and generating a mean gain factor from a combination of said plurality of segment gain factors; and modifying each of said plurality of segment gain factors by said mean gain factor thereby forming a respective plurality of modified segment gain factors, and separately multiplying said plurality of amplitude segment signals by the respective plurality of modified segment gain factors for supplying a non-linear signal.

* * * * *